(12) United States Patent
Sandrasekaran (10) Patent No.: US 12,104,649 B2
(45) Date of Patent: Oct. 1, 2024

(54) WHEEL BEARING SEALING ARRANGEMENT AND A VEHICLE

(71) Applicant: Volvo Truck Corporation, Gothenburg (SE)

(72) Inventor: Ramachandran Sandrasekaran, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 165 days.

(21) Appl. No.: 17/760,701

(22) PCT Filed: Oct. 15, 2019

(86) PCT No.: PCT/EP2019/077854
§ 371 (c)(1),
(2) Date: Mar. 15, 2022

(87) PCT Pub. No.: WO2021/073722
PCT Pub. Date: Apr. 22, 2021

(65) Prior Publication Data
US 2022/0333648 A1   Oct. 20, 2022

(51) Int. Cl.
*F16J 15/32*   (2016.01)
*F16C 19/38*   (2006.01)
(Continued)

(52) U.S. Cl.
CPC ........ *F16C 33/7813* (2013.01); *F16C 19/386* (2013.01); *F16C 33/7886* (2013.01);
(Continued)

(58) Field of Classification Search
CPC .............. F16C 33/7886; F16C 33/7896; F16J 15/3204; F16J 15/3232
See application file for complete search history.

(56) References Cited

U.S. PATENT DOCUMENTS 4,049,281 A * 9/1977 Bainard .............. F16J 15/3256
277/307
4,432,557 A * 2/1984 Drucktenhengst ... F16J 15/3256
277/560

(Continued)

FOREIGN PATENT DOCUMENTS

CN   103963567 A   8/2014
CN   203847704 U   9/2014
(Continued)

*Primary Examiner* — Vishal A Patel
(74) *Attorney, Agent, or Firm* — Withrow & Terranova, PLLC (57) ABSTRACT

There is provided a wheel bearing sealing arrangement for a wheel bearing of a vehicle, comprising an outboard bearing having an outboard periphery intended to face away from a central longitudinal axis of the vehicle and an inboard periphery intended to face towards the central longitudinal axis of the vehicle, wherein the outboard bearing comprises a first race-forming part and a second race-forming part which surrounds the first race-forming part; an outboard seal arranged between the first race-forming part and an opposite part; and a safety washer pressed against the outboard periphery of the first race-forming part, wherein the outboard seal comprises a sealing part pressed against and in direct contact with the safety washer. There is also provided a vehicle comprising such a wheel bearing sealing arrangement.

6 Claims, 5 Drawing Sheets

(51) Int. Cl.
*F16C 33/78* (2006.01)
*F16J 15/3204* (2016.01)
*F16J 15/3232* (2016.01)

(52) U.S. Cl.
CPC ....... *F16C 33/7896* (2013.01); *F16J 15/3204* (2013.01); *F16J 15/3232* (2013.01); *F16C 2326/02* (2013.01)

(56) References Cited

U.S. PATENT DOCUMENTS

| | | | | |
|---|---|---|---|---|
| 4,592,666 A | * | 6/1986 | Jornhagen | F16C 33/80 384/477 |
| 4,632,404 A | * | 12/1986 | Feldle | F16C 33/7859 277/423 |
| 4,863,292 A | * | 9/1989 | Dreschmann | F16J 15/3264 384/477 |
| 5,186,472 A | * | 2/1993 | Romero | F16J 15/3256 277/572 |
| 5,529,403 A | | 6/1996 | Martinie | |
| 5,908,248 A | * | 6/1999 | Nisley | F16J 15/3256 384/140 |
| 5,908,249 A | * | 6/1999 | Nisley | F16C 19/386 277/411 |
| 2007/0278748 A1 | * | 12/2007 | Matsui | F16C 33/7876 277/549 |
| 2012/0321489 A1 | | 12/2012 | Murakami et al. | |
| 2013/0011090 A1 | | 1/2013 | Shimizu et al. | |

FOREIGN PATENT DOCUMENTS

| | | |
|---|---|---|
| JP | S59127963 U | 8/1983 |
| JP | H09177772 A | 7/1997 |
| JP | 2006010042 A | 1/2006 |
| JP | 2013113319 A | 6/2013 |
| JP | 2016084911 A | 5/2016 |
| JP | 201753368 A | 3/2017 |
| JP | 2018053994 A | 4/2018 |
| JP | 2018115689 A | 7/2018 |

* cited by examiner

WHEEL BEARING SEALING ARRANGEMENT AND A VEHICLE

This application is a 35 USC 371 national phase filing of International Application No. PCT/EP2019/077854, filed Oct. 15, 2019, the disclosure of which is incorporated herein by reference in its entirety.

TECHNICAL FIELD

The invention relates to a wheel bearing sealing arrangement for a vehicle. The invention also relates to a vehicle comprising such a wheel bearing sealing arrangement.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

The wheels of a vehicle, such as a truck, are normally connected to a respective wheel end hub. In its turn, the wheel end hub may be connected to a rotatable wheel axle, whereby rotation of the wheel axle is conveyed into rotation of the wheels. The wheel end hub is commonly coaxially mounted to a wheel bearing which in turn is coaxially mounted around the wheel axle. Each wheel bearing has an inner ring and an outer ring between which bearing elements are provided for enabling relative rotation between the inner ring and the outer ring. The wheel end hub is fixedly connected to one of said rings, typically the outer ring, with which it rotates. In order to facilitate the relative rotation between the inner ring and the outer ring a lubricant, may be provided in the bearing. To prevent the lubricant from escaping to the ambient environment seals are normally provided.

The wheel bearing may suitably be placed around a spindle which is coaxial with the rotating wheel axle. A nut may be tightened to press the safety washer against the bearing to secure the bearing in place. A problem that may arise is that axle oil may accumulate at the wheel end and then there is as risk of oil ingress into the bearing elements at the outboard side of the wheel bearing. Although the wheel bearing is provided with an outboard seal, accumulated oil may splash over and around the safety washer and even find its way past the outboard seal into the bearing elements. Such oil ingress may damage the wheel bearing. In particular oil ingress contaminates the grease in the bearing. Oil together with grease may escape out of the bearing from the inboard seal, so bearing may starve for lubrication and therefore fail.

SUMMARY

An object of the invention is to mitigate the drawbacks of the prior art. This and other object which will become apparent in the following are accomplished by a wheel bearing sealing arrangement and a vehicle as defined in the accompanying independent claims.

According to a first aspect of the invention, the object is achieved by a wheel bearing sealing arrangement for a wheel bearing of a vehicle, comprising:

an outboard bearing having an outboard periphery intended to face away from a central longitudinal axis of the vehicle and an inboard periphery intended to face towards the central longitudinal axis of the vehicle, wherein the outboard bearing comprises a first race-forming part and a second race-forming part which surrounds the first race-forming part, an outboard seal arranged between the first race-forming part and an opposite part, and a safety washer pressed against the outboard periphery of the first race-forming part, wherein the outboard seal comprises a sealing part pressed against and in direct contact with the safety washer.

By the provision of a sealing part which is pressed against and in direct contact with the safety washer, the risk of oil ingress into the outboard bearing is reduced. In particular, the risk of splashes of oil which get past the safety washer to get all the way to the outboard bearing is reduced. For instance, if there is also provided another sealing part which is intended to seal against the first race-forming part, such another sealing part will be less subjected to oil splashes and will thus be able to prolong its capability to prevent oil ingress into the outboard bearing.

The above mentioned longitudinal axis of a vehicle may also be referred to as the roll axis of the vehicle. For the record, other vehicle directions are along the transverse (or pitch) axis and vertical (or yaw) axis. Furthermore, a geometrical centre axis may be defined for the wheel bearing sealing arrangement. When the vehicle drives straight (or for non-turning wheels), the geometrical centre axis of the wheel bearing sealing arrangement will be perpendicular to the longitudinal axis of the vehicle (and parallel with the transverse axis of the vehicle). Accordingly, it should be understood that the terms outboard and inboard, may define components that are separated along the geometrical centre axis. For instance, the above mentioned outboard periphery and inboard periphery are spaced along the geometrical centre axis.

The safety washer may be pressed against the outboard periphery of the first race-forming part in various manners. In at least some exemplary embodiments, the safety washer may be placed between a hub nut and the outboard periphery of the first race-forming part, wherein tightening of the hub nut causes the safety washer to be pressed against said outboard periphery.

As mentioned above, the outboard seal is arranged between the first race-forming part and an opposite part. The opposite part will normally face the first race-forming part and, suitably, the outboard seal is in firm contact with both parts. For instance, it may be fixedly attached to the opposite part. Depending on the particular design and configuration of the outboard bearing, there are different alternative embodiments of the opposite part. According to at least some exemplary embodiments, the opposite part may be an inner surface of the wheel end hub. Thus, the outboard seal may be arranged to extend from the first race-forming part to an inner surface of the wheel end hub. Accordingly, in at least some exemplary embodiments, wheel end hub forms part of the wheel bearing sealing arrangement. In other exemplary embodiments, the opposite part may be the second race-forming part. Thus, the outboard seal may be arranged to extend from the first race-forming part to the second race-forming part.

The first race-forming part may be an inner ring of the outboard bearing or may include an inner ring of the outboard bearing. Similarly, the second race-forming part may be an outer ring of the outboard bearing or may include an outer ring of the outboard bearing.

According to at least one exemplary embodiment, the first race-forming part comprises:

adjacent the inboard periphery, a race portion accommodating roller elements, and adjacent the outboard periphery, a holding portion accommodating the outboard seal. By having both a race portion and a holding portion, dual functionality is achieved for one component, instead of having separate components for the respective functionality. In at least some exemplary embodiments, the second race-forming part may also comprise adjacent the inboard periphery, a race portion accommodating roller elements, and adjacent the outboard periphery, a holding portion accommodating the outboard seal. However, in other exemplary embodiments, the second race-forming portion only comprises the race portion, in which case an inner surface of the wheel end hub may present a holding portion accommodating the outboard seal.

According to at least one exemplary embodiment the outboard seal comprises a supporting part which supports the sealing part, wherein the sealing part comprises a lip projecting away from the supporting part, wherein the lip is in sealing contact with the safety washer. By having a supporting part from which the sealing part with its lip projects a robust seal can be obtained.

As mentioned above, the wheel bearing sealing arrangement may have a geometrical centre axis. This is reflected in at least one exemplary embodiment, according to which the wheel bearing sealing arrangement has a geometrical centre axis, wherein said lip extends radially away from the geometrical centre axis. This is advantageous since splashes of oil will normally come around the outer periphery of the safety washer, i.e. at a radially outward location, and may find its way into the outboard bearing by passing along the first race-forming part. A radially outwardly extending lip provides a higher degree of resistance to splashes of oil falling radially inwardly.

According to at least one exemplary embodiment, the lip has a U-shaped cross-section, one leg of the U-shape being in sealing contact with the safety-washer and the other leg of the U-shape being attached to the supporting part. This provides a robust seal, making it difficult for the lip to be bent radially inwardly, which might otherwise result in inferior splash protection.

According to at least one exemplary embodiment, the safety washer is non-rotatingly in contact with the first race-forming part. According to at least some exemplary embodiments, the safety washer is in relation to the geometrical centre axis, non-rotatingly mounted in the wheel bearing sealing arrangement. According to at least some exemplary embodiments, the first race-forming part is in relation to the geometrical centre axis non-rotatingly mounted in the wheel bearing sealing arrangement. On the other hand, the second race-forming part and/or the outboard seal, may suitably be rotatably mounted in relation to the geometrical centre axis, and may suitably rotate with a wheel end hub.

According to at least one exemplary embodiment, the outboard seal is rotatingly in contact with the safety washer. For instance, if the safety washer is rotationally fixed relative to the geometrical centre axis and the outboard seal is allowed to rotate in relation to the geometrical centre axis, there will be relative rotation between the outboard seal and the safety washer.

According to at least one exemplary embodiment, said sealing part is a first sealing part, wherein the outboard seal further comprises a second sealing part which is sealingly pressed against the first race-forming part. The second sealing part, which may be a main sealing part, will thus get extra assistance in resisting oil ingress by means of the splash protecting first sealing part.

According to at least one exemplary embodiment, the first sealing part is a separate entity from the second sealing part. This is advantageous as the sealing parts may be easily manufactured as separate components, suitably of rubber, which may each be attached to the supporting part. The supporting part may, for instance, be made of or comprise sheet metal, and the sealing parts may be moulded to the supporting part. According to at least one exemplary embodiment, the first sealing part and the second sealing part are spaced apart from each other.

According to at least one exemplary embodiment, the outboard seal further comprises a third sealing part which is sealingly pressed against said opposite part. As mentioned previously, in at least some exemplary embodiments, the wheel bearing sealing arrangement comprises a wheel end hub. In such embodiments, said opposite part can be an inner surface portion of the wheel end hub against which the third sealing part is pressed. In other exemplary embodiments, the opposite part may be a holding portion of the second race-forming part, wherein the third sealing part would be sealingly pressed against said holding portion of the second race-forming part.

According to at least one exemplary embodiment, the first sealing part is a separate entity from the third sealing part. According to at least one exemplary embodiment, the first sealing part and the third sealing part are spaced apart from each other. This allows for a simple manufacturing of the outboard seal.

According to a second aspect of the invention, the object is achieved by a vehicle comprising a wheel bearing sealing arrangement according to the first aspect.

The advantages of the second aspect are largely analogous to the advantages of the first aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
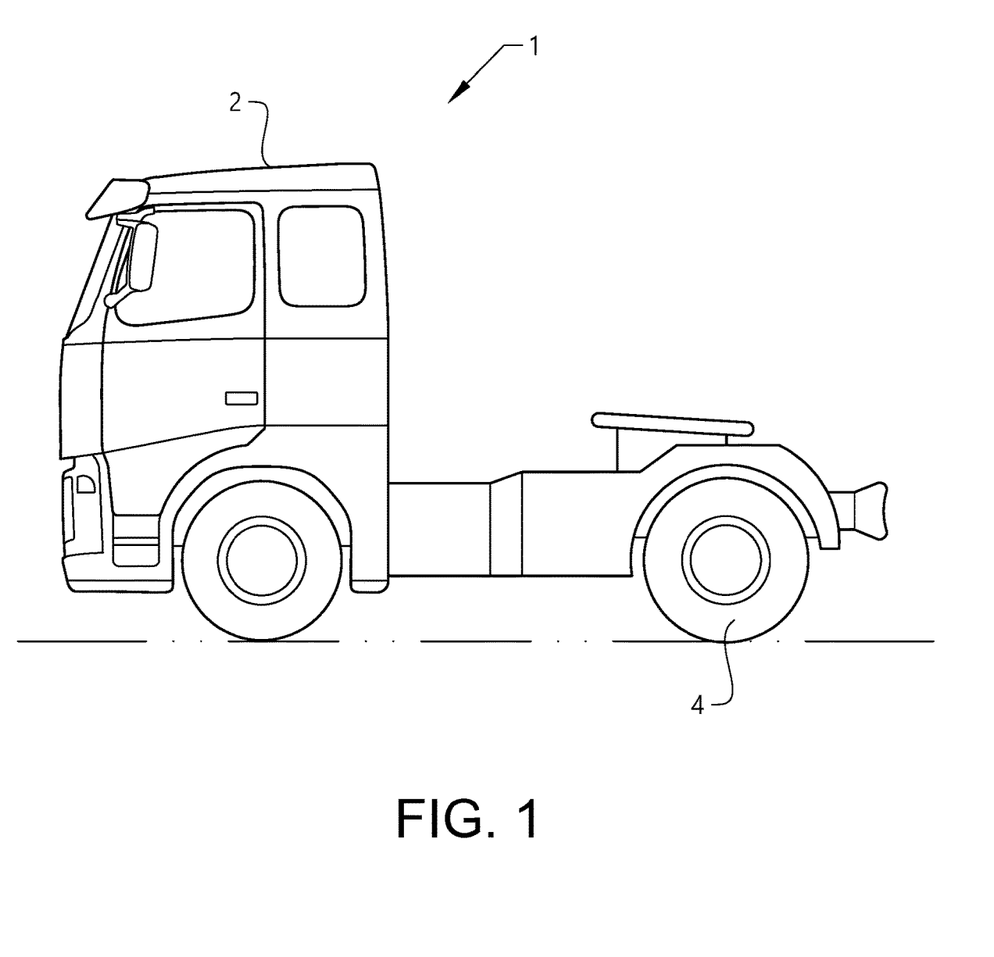
FIG. 1 illustrates a vehicle, in accordance with at least one exemplary embodiment of the invention.

FIG. 1 illustrates a vehicle 1, in accordance with at least one exemplary embodiment of the invention. Although the vehicle 1 is illustrated in the form of a truck, other types of vehicles, such as busses, construction equipment, trailers or passenger cars may be provided in accordance with the invention.

The truck (vehicle) comprises a cab 2 in which a driver may operate the vehicle 1. The vehicle 1 comprises a number of road wheels 4, herein illustrated as two pairs of wheels, however in other embodiments there may be a different number of wheels, such as three pairs, four pairs or more. The rotation of the wheels 4 is facilitated by means of wheel bearings (not shown in FIG. 1). The vehicle comprises 1 a wheel bearing sealing arrangement in which such a wheel bearing is included, which wheel bearing sealing arrangement will be further discussed in the following.

Figure 2:
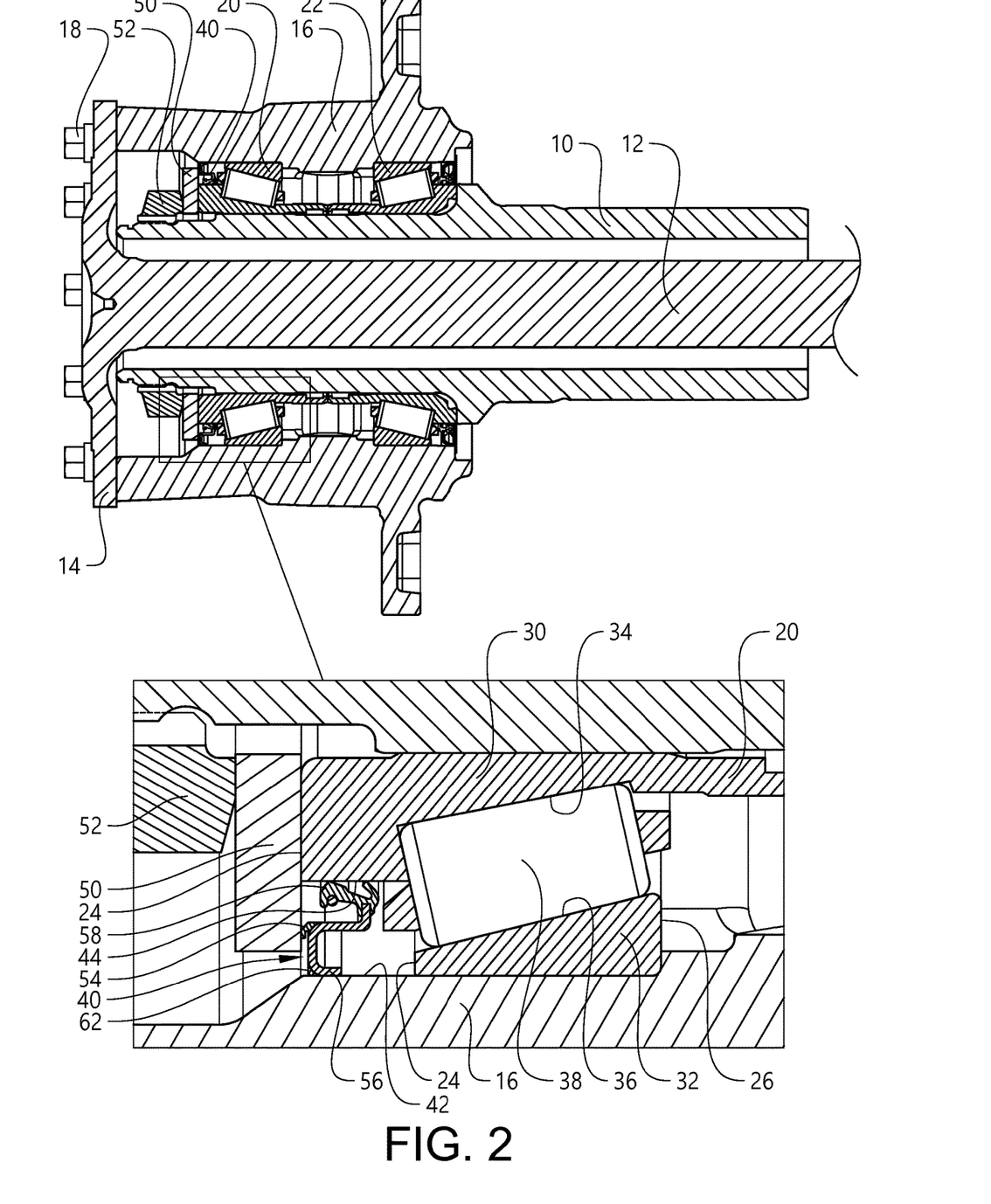
FIG. 2 illustrates a cross-section of a wheel bearing sealing arrangement in accordance with at least one exemplary embodiment of the invention, and also an enlarged detailed view of said cross section.

FIG. 2 illustrates a cross-section of a wheel bearing sealing arrangement in accordance with at least one exemplary embodiment of the invention, and also an enlarged detailed view of said cross section. A wheel bearing is provided concentrically around a spindle 10, which in turn concentrically surrounds a wheel axle 12. The wheel axle 12 is at its outboard end 14 fixed to a wheel end hub 16 by means of suitable fasteners such as bolts 18. The wheel end hub 16 is configured to received and hold a road wheel (not illustrated). The rotation of the wheel axle 12 is thus conveyed to the wheel end hub 16 and the road wheel, whereby the vehicle on which this assembly of parts is provided can be caused to move in a forward or reverse direction.

The wheel bearing comprises an outboard bearing 20 and an inboard bearing 22. Of the two, it is the inboard bearing 22 which is configured to be located closest to the central longitudinal axis of the vehicle. Conversely, of the two, it is the outboard bearing 20 which is configured to be located closest to the outboard end of the wheel axle.

The outboard bearing has an outboard periphery 24 intended to face away from the central longitudinal axis of the vehicle and an inboard periphery 26 intended to face towards the central longitudinal axis of the vehicle. The outboard bearing 20 comprises a first race-forming part 30 and a second-race forming part 32 which surrounds the first race-forming part 30. Adjacent the inboard periphery 26, the first race-forming part 30 has a race portion 34. The second race-forming part 32 also has a race portion 36. Roller elements 38 are accommodated between the race portions 34, 36 of the first and second race-forming parts 30, 32. The roller elements 38 may suitably be circumferentially separated from each other by a cage having individual holes for each roller element. The relative motions of the first and second race-forming parts 30, 32 causes the roller elements 38 to roll with very little rolling resistance. The first race-forming part 30 may also be referred to as an inner ring and the second race-forming part 32 may be referred to as an outer ring.

An outboard seal 40 is arranged between the first race-forming part 30 and an opposite part which, in this illustrated exemplary embodiment, is an inner surface 42 of the wheel end hub 16. Thus, adjacent the outboard periphery 24, the first race-forming part 30 has a holding portion 44 (next to the race portion 34) for accommodating the outboard seal 40. In other exemplary embodiments, the second race-forming part 32 may be made larger/longer so that it too would comprise a holding portion next to its race portion 36, in which case the outboard seal 40 may be arranged between the first race-forming part 30 and the second race-forming part 32 (i.e. the second race-forming part would be the above-mentioned opposite part).

A safety washer 50 is pressed against the outboard periphery 24 of the first race-forming part 30. In the illustrated exemplary embodiment, a hub nut 52 is tightened around the spindle 10 for pressing the safety washer 50 against the outboard periphery 24 of the first race-forming part 30. The outboard seal 40 comprises a sealing part 54 pressed against and in direct contact with the safety washer 50. This sealing part 54 reduces the risk of splash-induced oil ingress to the roller elements 38.

Thus, the wheel bearing sealing arrangement comprises the outboard bearing 20, the outboard seal 40, the safety washer 50, and in the present embodiment also the inner surface 42 of the wheel end hub 16. In other exemplary embodiments, the inner surface 42 of the wheel end hub 16 is not included in the wheel bearing sealing arrangement, since the outboard seal 40 may instead extend between the first and second race-forming parts 30, 32 of the outboard bearing 20.

Figure 5:
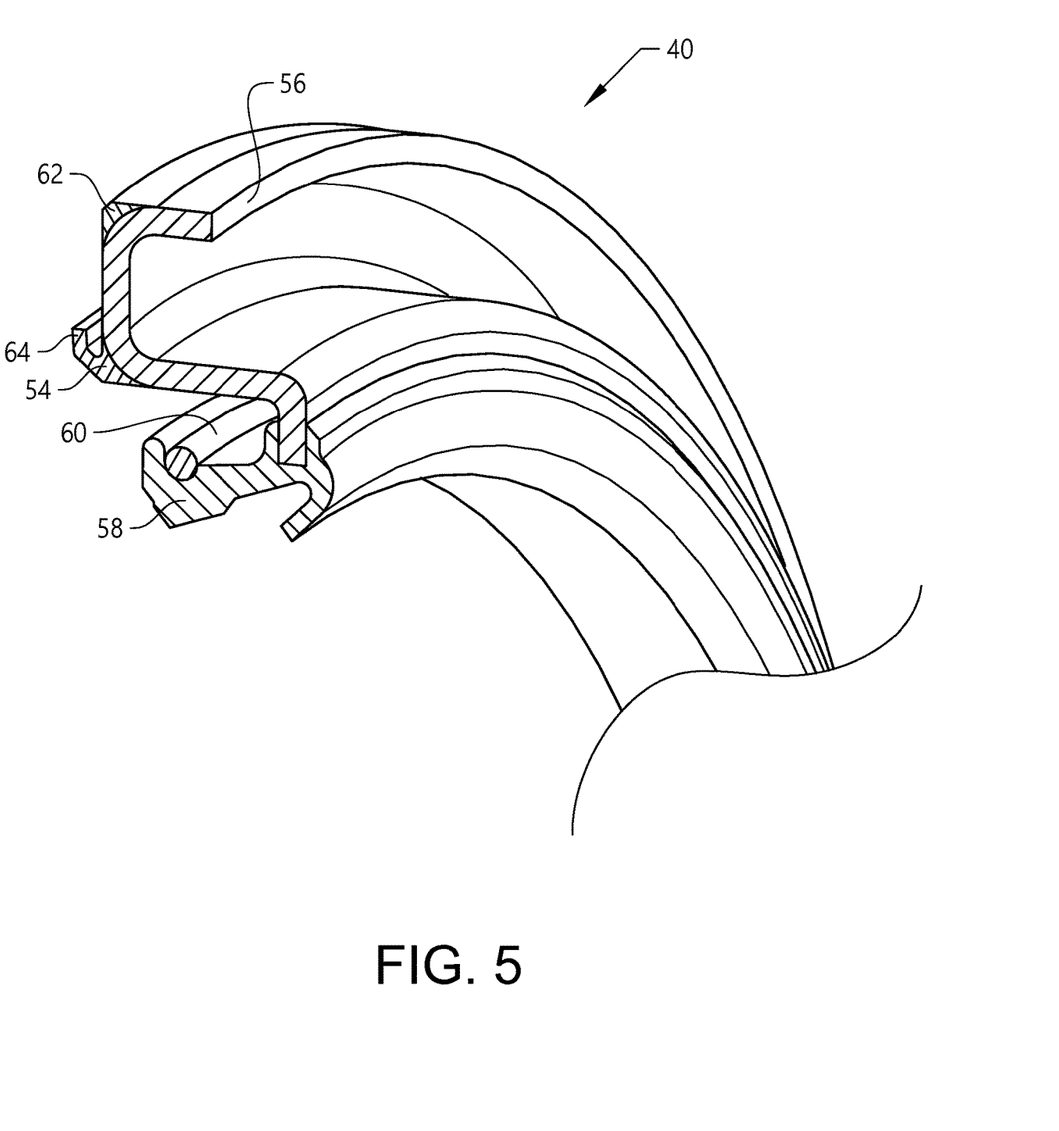
FIG. 5 illustrates a detailed perspective view, partly in cross-section, of an outboard seal which forms part of a wheel bearing sealing arrangement according to at least one exemplary embodiment of the invention.

In the illustrated exemplary embodiment, the sealing part 54 which is pressed against the safety washer 50 is supported by a supporting part 56. The supporting part 56 is, in this exemplary embodiment also supporting other sealing parts, more specifically two other sealing parts, as best seen in FIG. 5. The sealing part 54 which is pressed against the safety washer 50 may be referred to as a first sealing part 54.

A second sealing part 58 is configured to be sealingly pressed against the first race-forming part 30 (more particularly against the holding portion 44 of the first race-forming part 30). As seen in FIG. 5, a metal ring 60 is provided to tighten the second sealing part 58 against the first race-forming part 30. The first sealing part 54 is suitably a separate entity from the second sealing part 58, and may suitably be manufactured individually of each other. As illustrated in FIG. 5, the first sealing part 54 and the second sealing part 58 may suitably be spaced apart from each other.

A third sealing part 62 (see FIG. 5) is configured to be in sealing contact with the inner surface 42 of the wheel end hub 16 (or in other embodiments in sealing contact with the second race-forming part 32). Suitably, the first sealing part 54 is a separate entity from the third sealing part 62 and they may be individually manufactured. As illustrated in FIG. 5, the first sealing part 54 and the third sealing part 62 may be spaced apart from each other.

The supporting part 56 may suitably be of sheet metal, while the first, second and third sealing parts 54, 58, 62 may suitably be made of rubber, however, other material choices are also conceivable.

As best seen in FIG. 5 the first sealing part 54 may comprise a lip 64 projecting away from the supporting part 56, wherein the lip 64 is configured to be in sealing contact with the safety washer 50. The wheel bearing sealing arrangement has a geometrical centre axis, which coincides with the elongated extension of the wheel axle 12, and the lip 64 may extend radially away from the geometrical centre axis. The lip 64 may suitably have a U-shaped cross-section, wherein one leg of the U-shape may be configured to be in sealing contact with the safety washer and the other leg of the U-shape may be attached to the supporting part, as seen in FIG. 5. Although the illustrated first sealing part 54 has a rather short extension along the geometrical centre axis, other configurations and attachments are conceivable. For instance, in at least some exemplary embodiments, the first sealing part 54 may have a longer extension along the geometrical centre axis. For instance, the first sealing part 54 may be attached to the supporting part 56 such that it extends radially inwardly of and along the supporting part 56, coaxially with said geometrical centre axis.

Figure 3:
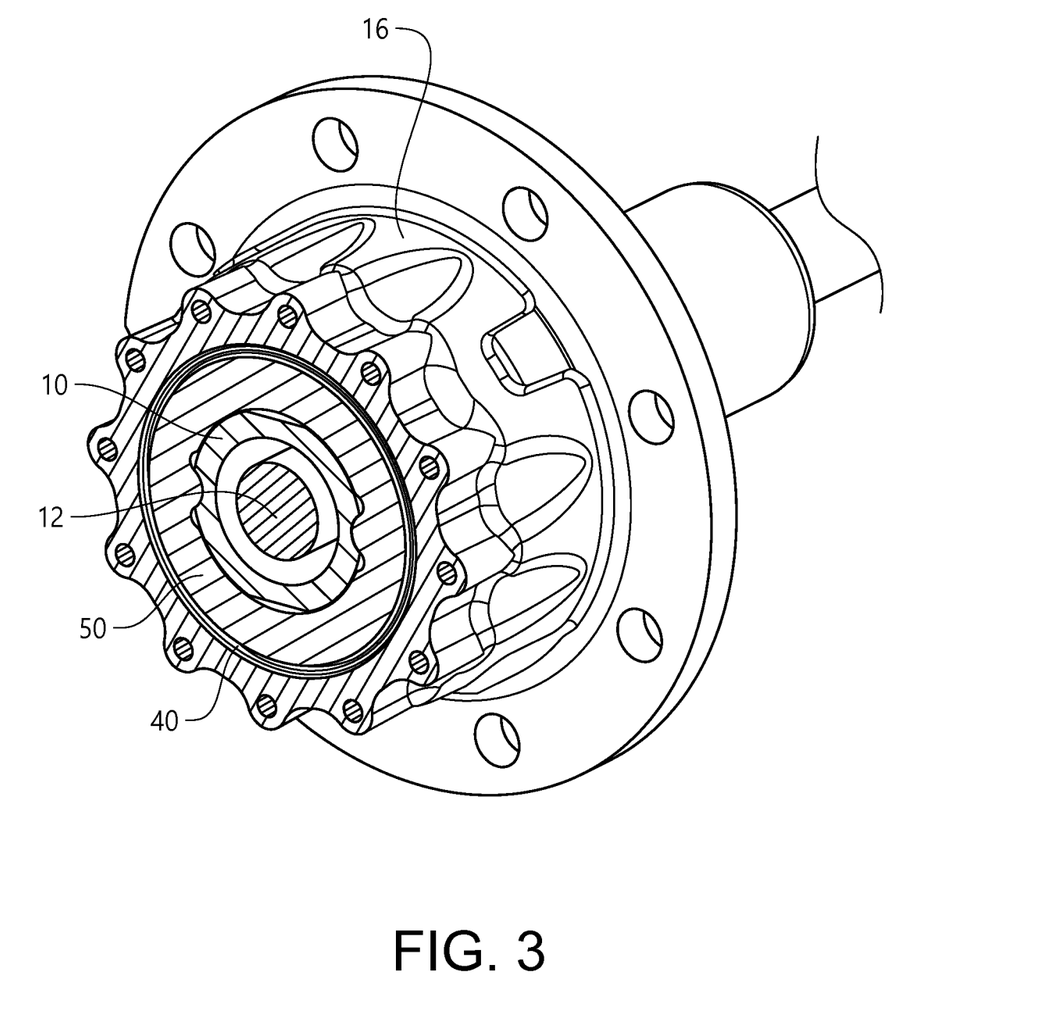
FIG. 3 illustrates a perspective view, partly in cross-section.
Figure 4:
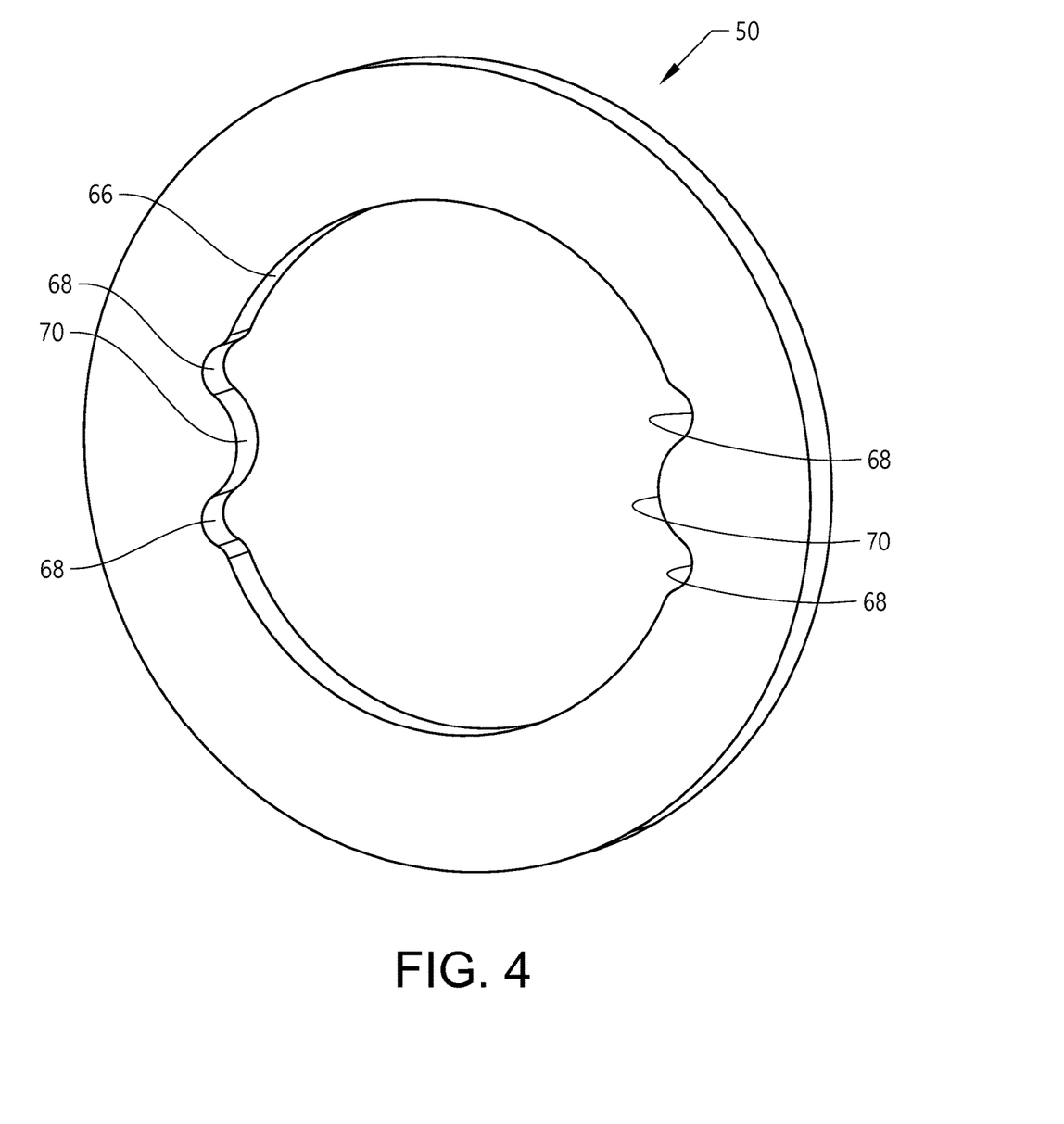
FIG. 4 illustrates a safety washer which may form part of a wheel bearing sealing arrangement according to at least one exemplary embodiment of the invention.

FIG. 4 illustrates a safety washer 50 which may form part of a wheel bearing sealing arrangement according to at least one exemplary embodiment of the invention. In the illustrated exemplary embodiment the inner periphery 66 of the safety washer 50 has sections with notches 68 and protrusions 70, which are designed to mate with receiving contoured shapes of the spindle 10 around which the safety washer 50 and the hub nut 52 is mounted. This is best seen in FIG. 3, which illustrates a perspective view, partly in cross-section. In this cross-sectional view the outboard seal 40 is slightly visible behind the safety washer 50.

With reference to the exemplary embodiment of FIG. 2, the following components will rotate around the geometrical centre axis when the wheel axle 12 rotates:
- the wheel end hub 16,
- the second race-forming part 32 of the outboard bearing 20 (and, of course, also a corresponding second race-forming part of the inboard bearing 22),
- the roller elements 38 and any cage holding the roller elements between the first and second race-forming parts 30, 32 of the outboard bearing 20 (and of course, also corresponding roller elements and any cage in the inboard bearing 22), and
- the outboard seal 40.

With reference to the exemplary embodiment of FIG. 2, the following components will not rotate around the geometrical centre axis when the wheel axle 12 rotates:
- the safety washer 50,
- the hub nut 52,
- the spindle 10, and
- the first race-forming part 30 of the outboard bearing 20 (and, of course, also a corresponding first race-forming part of the inboard bearing 22).

Thus, from the above, it should be clear that, in at least some exemplary embodiments, the safety washer 50 is non-rotatingly in contact with the first race-forming part 30. Furthermore, the outboard seal 40 is suitably rotatingly in contact with the safety washer 50. As the outboard seal 40 rotates relative to the non-rotating first race-forming part 30, the second seal part 58 may not be enough in the long run to counteract ingress of oil due to oil accumulating at the end of the wheel axle 12 and wheel end hub 16. By the provision of the first seal part 54 which rides on the safety washer 50 within the wheel end hub 16, an extra protection is achieved. More particularly, splashes of oil which pass around the safety washer 50 will not as easily reach the interface between the second seal part 58 and the first race-forming part 30, since the first seal part 54 with its lip 64 will form a splash barrier. Thus, the risk of oil ingress is reduced or at least the time until ingress occurs is prolonged.

It is to be understood that the present invention is not limited to the embodiments described above and illustrated in the drawings; rather, the skilled person will recognize that many changes and modifications may be made within the scope of the appended claims.

The invention claimed is:

1. A wheel bearing sealing arrangement for a vehicle, comprising:
an outboard bearing having an outboard periphery intended to face away from a central longitudinal axis of the vehicle and an inboard periphery intended to face towards the central longitudinal axis of the vehicle, wherein the outboard bearing comprises a first race-forming part and a second race-forming part which surrounds the first race-forming part,
an outboard seal arranged between the first race-forming part and an opposite part,
a safety washer pressed against the outboard periphery of the first race-forming part, and
a hub nut presses the safety washer against the outboard periphery of the first race-forming part,
wherein the wheel bearing sealing arrangement is configured to seal a wheel bearing of a wheel of the vehicle,
wherein the outboard seal comprises a sealing part pressed against and in direct contact with the safety washer,
wherein the outboard seal comprises a supporting part which supports the sealing part,
wherein the sealing part comprises a lip projecting away from the supporting part,
wherein the lip is in sealing contact with the safety washer,
wherein the wheel bearing sealing arrangement has a geometrical center axis,
wherein the lip extends radially away from the geometrical center axis,
wherein the sealing part is a first sealing part,
wherein the outboard seal further comprises a second sealing part which is sealingly pressed against the first race-forming part,
wherein the outboard seal further comprises a third sealing part which is sealingly pressed against the opposite part,
wherein the first sealing part is a separate entity from the third sealing part,
wherein the first sealing part and the third sealing part are spaced apart from each other,
wherein the supporting part comprises a first material and the first sealing part, the second sealing part, and the third sealing part comprise materials different from the first material,
wherein the first sealing part is separate entity from the second seal part, and
wherein the first sealing part and the second sealing part are spaced apart from each other.

2. The wheel bearing sealing arrangement of claim 1, wherein the first race-forming part comprises:
a race portion accommodating roller elements adjacent to the inboard periphery, and
a holding portion accommodating the outboard seal adjacent to the outboard periphery.

3. The wheel bearing sealing arrangement of claim 1, wherein the lip has a U-shaped cross-section, one leg of the U-shape being in sealing contact with the safety washer and the other leg of the U-shape being attached to the supporting part.

4. The wheel bearing sealing arrangement of claim 1, wherein the safety washer is non-rotatingly in contact with the first race-forming part.

5. The wheel bearing sealing arrangement of claim 1, wherein the outboard seal is rotatingly in contact with the safety washer.

6. A vehicle comprising the wheel bearing sealing arrangement of claim 1.

* * * * *